United States Patent
Marchlewski et al.

(10) Patent No.: US 9,162,715 B1
(45) Date of Patent: Oct. 20, 2015

(54) CORNER CLOSEOUT MEMBER AND ASSEMBLY FOR PICKUP TRUCK BOX

(71) Applicant: Ford Global Technologies, LLC, Dearborn, MI (US)

(72) Inventors: Jack Marchlewski, Saline, MI (US); John Comiez, Novi, MI (US); Mark Joseph Courtright, Allen Park, MI (US); Vincent Chimento, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/317,293

(22) Filed: Jun. 27, 2014

(51) Int. Cl.
*B62D 33/02* (2006.01)
*B62D 33/023* (2006.01)

(52) U.S. Cl.
CPC .............. *B62D 33/02* (2013.01); *B62D 33/023* (2013.01)

(58) Field of Classification Search
CPC .... B62D 33/02; B62D 33/023; B62D 29/008; B62D 21/09
USPC ................ 296/29, 30, 193.08, 203.04, 181.1, 296/181.3, 182.1, 183.1, 183.2, 186.1
See application file for complete search history.

(56) References Cited

U.S. PATENT DOCUMENTS

| | | | |
|---|---|---|---|
| 1,579,388 A * | 4/1926 | Palmer | 296/180 |
| 5,839,775 A | 11/1998 | Young et al. | |
| 6,742,832 B1 * | 6/2004 | Miskech et al. | 296/183.1 |
| 6,814,397 B2 | 11/2004 | Henderson et al. | |
| 7,722,111 B2 * | 5/2010 | Reich et al. | 296/183.1 |
| 2003/0001409 A1 * | 1/2003 | Semple et al. | 296/183 |
| 2003/0218360 A1 * | 11/2003 | Henderson et al. | 296/183 |
| 2005/0236867 A1 * | 10/2005 | McNulty et al. | 296/183.1 |
| 2005/0242620 A1 * | 11/2005 | McNulty et al. | 296/183.1 |
| 2006/0082191 A1 * | 4/2006 | McNulty et al. | 296/183.1 |
| 2007/0085381 A1 * | 4/2007 | Delaney et al. | 296/193.08 |
| 2009/0026786 A1 * | 1/2009 | Reich et al. | 296/37.6 |
| 2011/0188979 A1 * | 8/2011 | Ketels et al. | 414/519 |
| 2014/0225395 A1 * | 8/2014 | Takata | 296/183.1 |
| 2014/0284956 A1 * | 9/2014 | McBride | 296/36 |

OTHER PUBLICATIONS

FMA, the fabricator.com, Warm forming of alloys in the auto industry, BrightLine fiber, Stamping Journal, Jun. 28, 2013 Publication Jul./Aug. 2013.
Landrover, 1987 Defender Parts Catalogue, Select pages from Body and Chassis section.
Stamping Journal, Strip feeding Improvement tips, A tool coatings overview, Warm forming aluminum alloys, Leveling: A stress-reliever, www.STAMPINGJOURNAL.com, Jul./Aug. 2013.

* cited by examiner

*Primary Examiner* — Gregory Blankenship
(74) *Attorney, Agent, or Firm* — Raymond L. Coppiellie; Brooks Kushman P.C.

(57) ABSTRACT

A closeout member is provided which may be disposed within an opening partially defined by a corner member and a rail edge of a side panel adjacent to a tailgate and tail lamp of a pickup truck box. The closeout member may include an outboard side secured to the corner member and shaped to substantially match a curvature of the corner member and a forward side secured at the rail edge such that the closeout member reinforces the curvature of the corner member. The closeout member may also include an inboard edge and an extension member extending at a substantially ninety degree angle downwardly from the inboard edge and may be at least partially secured to the corner member. The side panel and closeout member may be five or six thousand series aluminum.

20 Claims, 6 Drawing Sheets

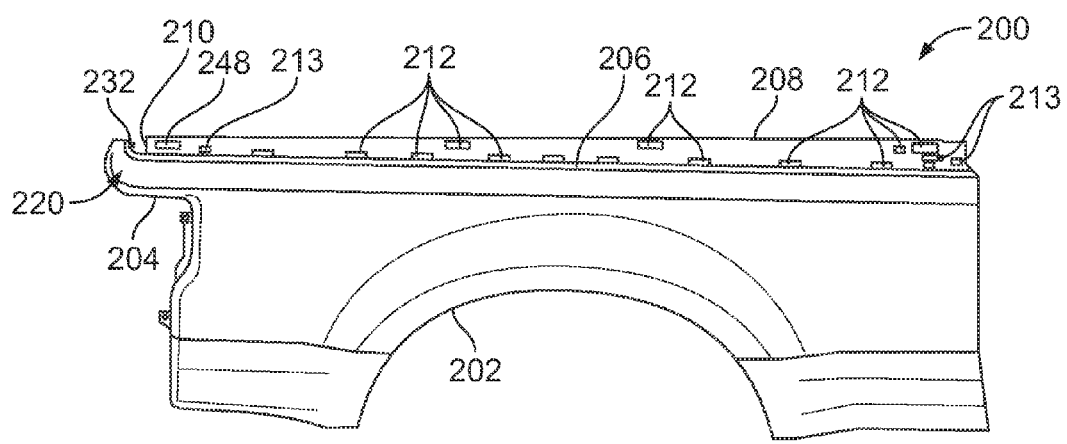
FIG. 10
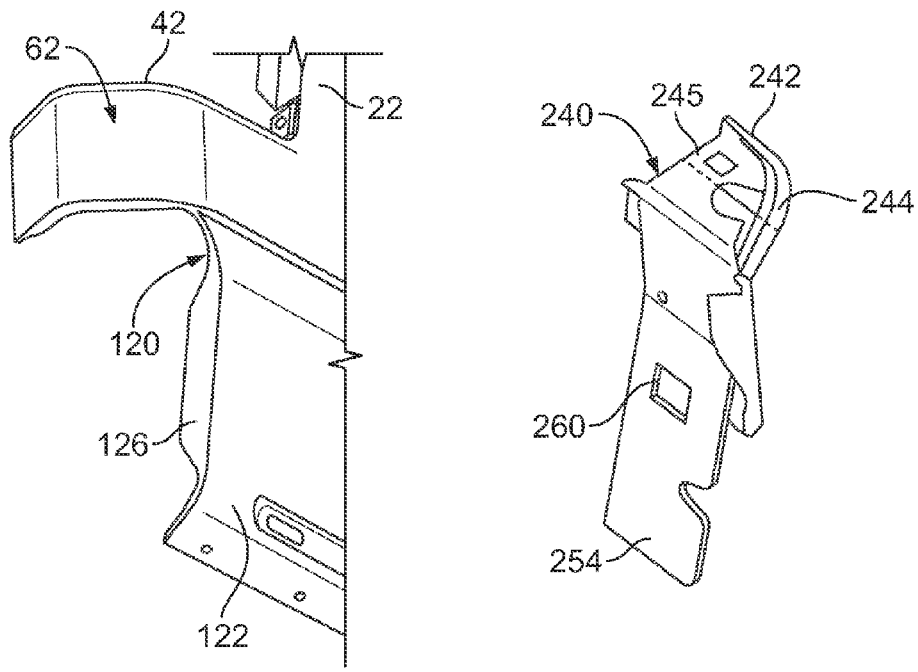
FIG. 7
FIG. 11

CORNER CLOSEOUT MEMBER AND ASSEMBLY FOR PICKUP TRUCK BOX

TECHNICAL FIELD

The present disclosure relates to assemblies for reinforcing aluminum pickup truck boxes and components thereof.

BACKGROUND

Pickup trucks are motor vehicles with a front passenger area, often referred to as a cab, and an open top rear cargo area, often referred to as a box. The box usually has a substantially flat bed from which two side body panels and a forward interconnecting header extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in many different ways, including carrying a variety of types of cargo and towing various types of trailers.

Stamped pickup truck box body panels may often be made from steel sheet metal which may be formed in a draw operation. Characteristics and properties of the steel sheet metal provide multiple options for forming vehicle components. Aluminum sheet metal does not share the same or similar formability characteristics and properties as steel sheet metal. While weight advantages may be obtained by using aluminum sheet metal instead of steel sheet metal, certain constraints relating to the formability of aluminum may require additional structural reinforcement. For example, corners of a pickup truck box are difficult to integrally form and also receive tailgate and user generated loads which require reinforcement to meet performance requirements. The corners also include an A-surface which has certain fit and finish requirements which may not be compromised by certain reinforcement options which result in deformation or other aesthetically displeasing marks.

This disclosure is directed to solving the above problems and other problems as summarized below.

SUMMARY

According to an aspect of the present disclosure, a closeout member is disposed within an opening partially defined by a corner member and a rail edge of a side panel adjacent to a tailgate and tail lamp of a pickup truck box. The closeout member includes an outboard side secured to the corner member and shaped to substantially match a curvature of the corner member and a forward side secured at the rail edge such that the closeout member reinforces the curvature of the corner member. The closeout member may also include an inboard edge and an extension member extending at a substantially ninety degree angle downwardly from the inboard edge and may be at least partially secured to the corner member. The extension member may define a tailgate striker hole adjacent to the corner member. The extension member may extend from the corner member in a substantially rearward and transverse direction from a portion of the side panel adjacent to and below the tail lamp to a lower rear corner member. The closeout member may further define an accessory hole adjacent to a rail member of the side panel that is configured to receive attachable accessories. The side panel may be five or six thousand series aluminum.

According to another aspect of the present disclosure, a pickup truck assembly includes a pickup truck bed having forward and rear ends, a header mounted to the truck bed at the forward end, a tailgate mounted for rotation to the bed at the rear end, and one or more outer body side panels having forward box pillar and rear box pillar ends, mounted to the truck bed, and secured to the header at the forward box pillar end. The side panels define an upper panel portion extending from the forward box pillar end to the rear box pillar end and a tail lamp opening at the rear box pillar end. The side panels also define a rail member transversely extending inboard from the upper panel portion and along a first longitudinal length from the forward box pillar end toward the rear box pillar end, and a rear rail edge adjacent to the tail lamp opening. The side panels also define an upper rear corner member at the rear box pillar end extending from the upper panel portion adjacent to the rear rail edge and curving transversely inboard to define a substantially vertical corner edge adjacent to the tailgate and a substantially horizontal upper corner edge such that the rear rail edge and the upper corner edge at least partially define an upper rear corner opening. The pickup truck assembly also includes a closeout member connected to the rail member and partially disposed within the upper rear corner opening to provide additional support to the upper rear corner member. The closeout member is further connected for reinforcement to the upper rear corner member across the inboard transverse curved portion. A surface of the rail member may define a first plane and a surface of the closeout member may define a second plane substantially coplanar with the first plane. The pickup truck assembly may also include a bumper pocket bracket and the side panel may further include a lower rear corner member extending in a substantially rearward and transverse direction from a portion of the side panel to further define the tail lamp opening and a bumper pocket opening. The lower rear corner member may define a bumper pocket tab for securing the bumper pocket bracket, and a portion of a bumper may be at least partially disposed within the bumper pocket opening. The assembly may also include an extension member having a rail extension portion secured to the upper rear corner member, and a vertical extension portion extending at a substantially ninety degree angle downwardly from the rail extension portion. The vertical extension portion may further be secured to and reinforcing the upper rear corner member and the lower rear corner member. The extension member may define a tailgate striker hole adjacent to the lower rear corner member that is adapted to receive a striker of the tailgate. The closeout member may define an accessory hole rearward of the rear rail edge. The side panel may be made of five or six thousand series aluminum.

According to a further aspect of the present disclosure, a structural reinforcement assembly for an aluminum pickup truck box includes a truck bed having a rear end, a tailgate mounted for rotation to the bed at the rear end, and a stamped outer body side panel secured to the truck bed. The outer body side panel includes a tail lamp opening, a wheel house opening, a front panel portion forward of the wheel house, a rear panel portion rearward of the wheel house, and a rear upper corner member extending and curving from a region of the rear panel portion adjacent to the tail lamp opening to the tailgate. The outer body side panel also includes an upper edge extending from the front panel portion to the rear panel portion and a rail member transversely extending inboard from substantially the upper edge along the front panel portion and rear panel portion and defining a transverse rear rail edge. The assembly further includes a closeout member sized for disposition within an upper rear opening defined by the rear upper corner member and the transverse rear rail edge, and the closeout member is secured to and reinforcing the upper rear corner member and the rail edge. The assembly may also include a bumper pocket bracket, and the side panel may further include a lower rear corner member extending in a substantially rearward and transverse direction from a portion of the side panel to further define the tail lamp opening and a bumper pocket opening. The lower rear corner member may define a bumper pocket tab for securing the bumper pocket bracket, and a portion of a bumper may be at least partially disposed within the bumper pocket opening. The assembly may further include an extension member having a rail extension portion secured to the upper rear corner member, and a vertical extension portion extending at a substantially ninety degree angle from the rail extension portion. The vertical extension portion may further be secured to and reinforcing the lower rear corner member, the upper rear corner member, and the bumper pocket bracket. The closeout member may define an inboard edge and an extension member extending at a substantially ninety degree angle downwardly from the inboard edge which may be secured to the upper rear corner member. The closeout member may further define a tailgate striker opening adjacent to the upper rear corner member that is adapted to receive a striker of the tailgate. The closeout member may define an accessory hole for mounting accessories to the outer body side panel. The side panel may be five or six thousand series aluminum.

The above aspects of the disclosure and other aspects will be apparent to one of ordinary skill in the art in view of the attached drawings and the following detailed description of the illustrated embodiments.

BRIEF DESCRIPTION OF THE DRAWINGS

FIG. 7 is a perspective view of a rear lower corner portion of the side panel of FIG. 2.

FIG. 10 is a side perspective view of another example of a side panel for a pickup truck box.

FIG. 11 is a perspective view of an example of a closeout member to assist in reinforcing an upper rear corner of the side panel of FIG. 10.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
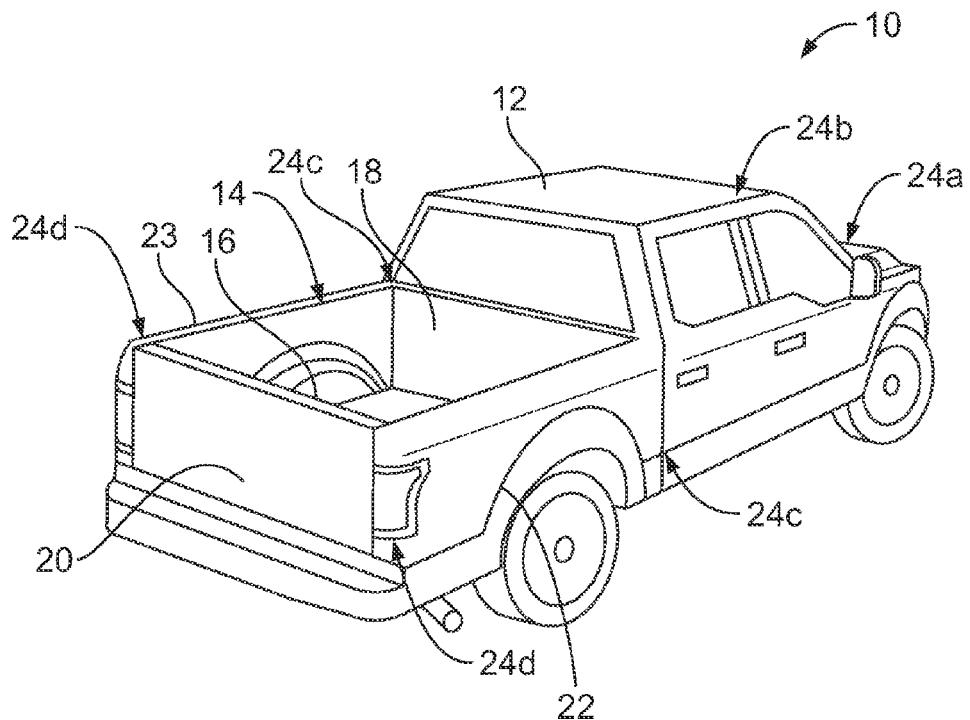
FIG. 1 is a rear perspective view of a vehicle.
Figure 2:
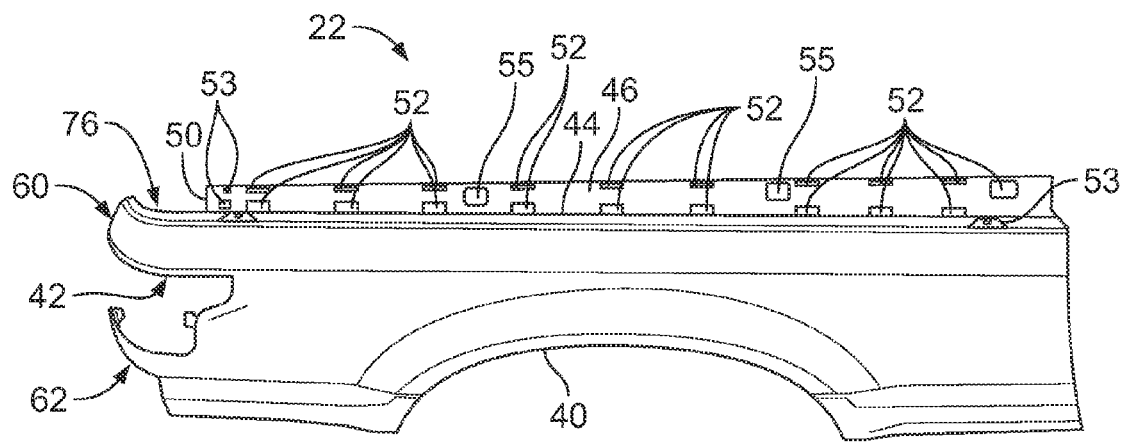
FIG. 2 is a side perspective view of an example of a side panel for a pickup truck box of the vehicle of FIG. 1.
Figure 4:
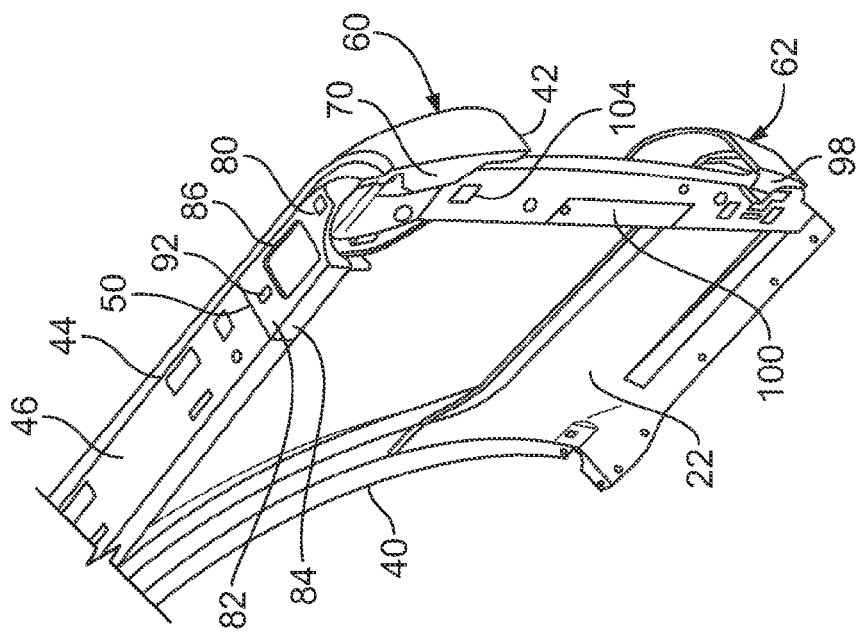
FIG. 4 is an elevated perspective view of a rear portion of the side panel of FIG. 2 and a portion of a closeout assembly.
Figure 3:
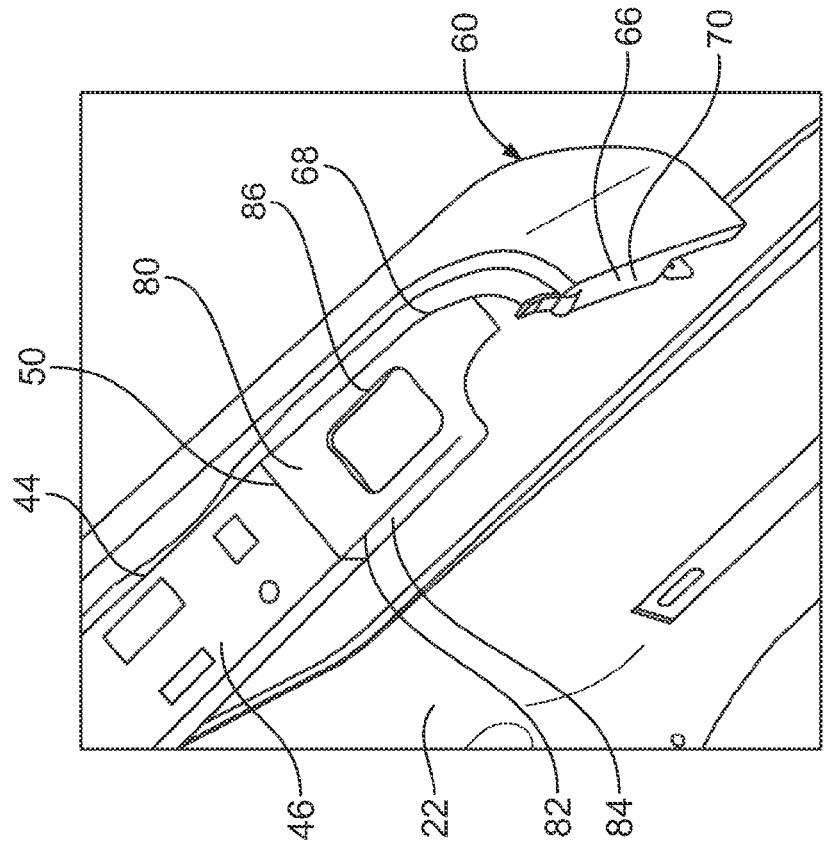
FIG. 3 is an elevated fragmentary perspective view of an upper rear corner portion of the side panel of FIG. 2.
Figure 6:
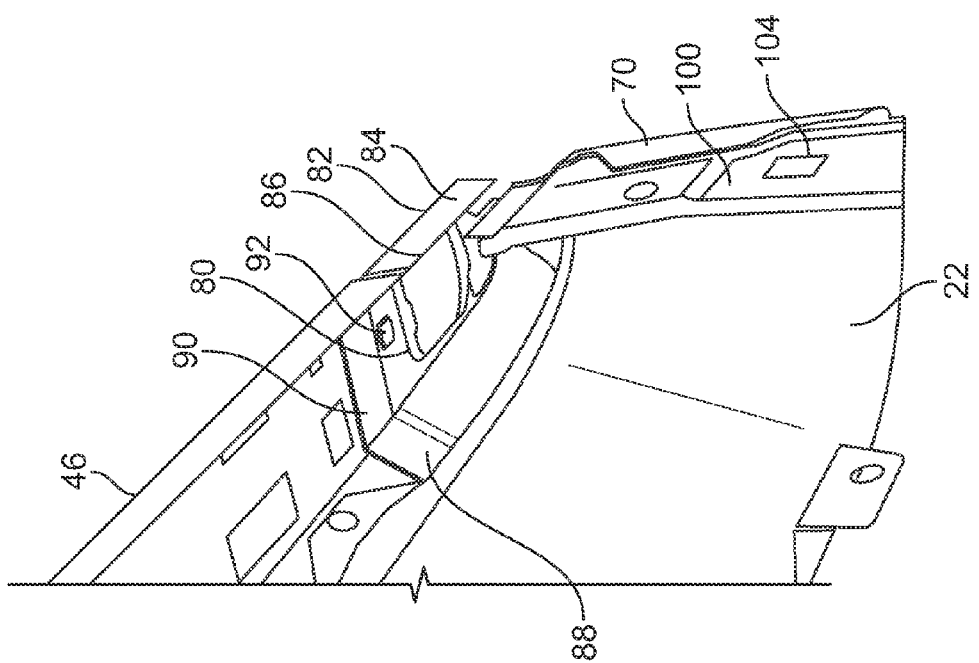
FIG. 6 is a perspective view of a portion of the side panel from FIG. 2 and the closeout assembly of FIG. 4.
Figure 5:
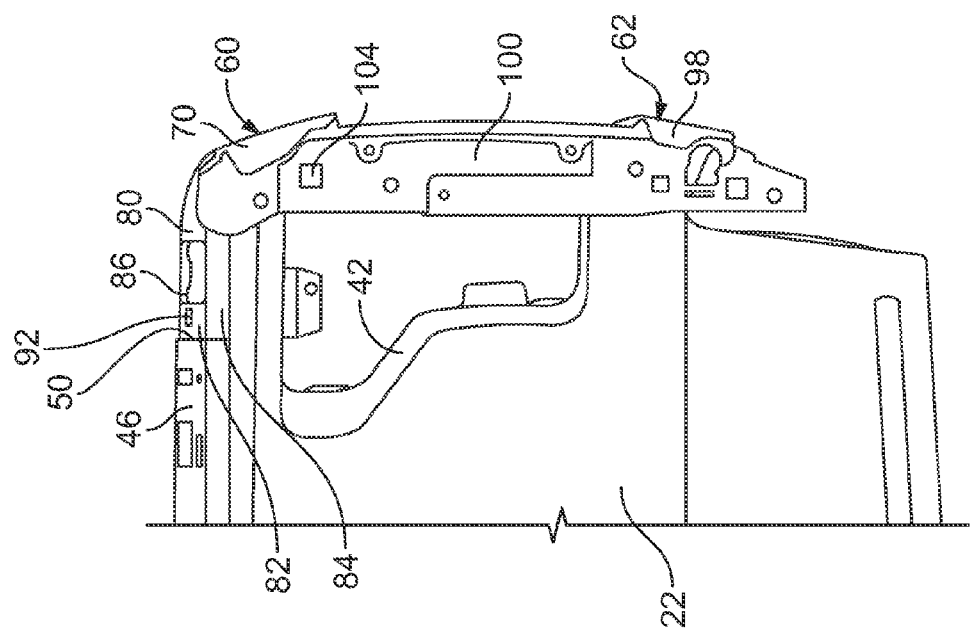
FIG. 5 is a side perspective view of a portion of the side panel from FIG. 2 and the closeout assembly of FIG. 4.

Referring to FIG. 1, an example of a vehicle 10 is illustrated that includes a cabin 12 and a truck box 14 supported by a vehicle chassis (not shown). The vehicle 10 may be, for example, a pickup truck comprising a majority of aluminum components. The truck box 14 includes a bed 16 having a forward end adjacent to the cabin 12 and a rear end opposite the forward end. The bed 16 supports a header 18 at the forward end and a tailgate 20 at the rear end. The tailgate 20 is mounted to the bed 16 for rotation. The bed 16 may also support a first body side panel 22 and a second body side panel 23. In this example, the vehicle 10 may include an A-pillar region 24a, a B-pillar region 24b, a C-pillar region 24c, and a D-pillar region 24d. The illustrated vehicle 10 is a four door configuration, however other configurations, such as a two door configuration may be adopted to incorporate the disclosed concepts. Alternate configurations may include different pillar region references than vehicle 10. The first body side panel 22 and second body side panel 23 may be secured to the header 18 at respective regions referred to as forward box pillar regions of the truck box 14 or the C-pillar regions 24c herein. The tailgate 20 rotates from at least an open position to a closed position. In the closed position as shown in FIG. 1, each lateral end of the tailgate 20 may be removably attached to the first body side panel 22 and the second body side panel 23 at respective regions referred to as rear box pillar regions or the D-pillar regions 24d herein. Components of the vehicle 10, such as the tailgate 20 and the side panels 22 and 23, may be made of five thousand series or six thousand series aluminum alloy.

Aluminum alloys are generally identified by a four-digit number, the first digit of which typically identifies the major alloying element. When describing a series of aluminum alloys based on the major alloying element, the first number may be followed by three x's (upper or lower case) or three 0's (zeros). For example, the major alloying element in 6xxx or 6000 series aluminum alloy is magnesium and silicon, while the major alloying element of 5xxx or 5000 series is magnesium and for 7xxx or 7000 series is zinc. Additional numbers represented by the letter 'x' or number '0' in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

One example of a configuration of the first body side panel 22 is shown in FIGS. 2 through 6. The first body side panel 22 disclosure relates to the second body side panel 23 which substantially mirrors the first body side panel 22. The first body side panel 22 may define a wheel house opening 40 and a tail lamp opening 42. A portion of the first body side panel 22 forward of the wheel house opening 40 is referred to as a front panel portion. A portion of the first body side panel 22 rearward of the wheel house opening 40 is referred to as a rear panel portion. A portion of the first body side panel 22 above the wheel house opening 40 is referred to as an upper panel portion that extends from the C-pillar region 24c to the D-pillar region 24d. An upper body side panel edge 44 may be defined by the first body side panel 22 and extends from the front panel portion to at least the rear panel portion. A rail member 46 extends transversely inboard from the upper body side panel edge 44 and may extend longitudinally from the front panel portion to the rear panel portion. The rail member 46 may also extend longitudinally along the upper body side panel edge 44 and define a rear rail edge 50. The rail member 46 may also define one or more rail member openings 52 to provide access points for vehicle 10 accessories, locating holes 53 to assist with installation of the first body side panel 22 to the vehicle 10, and tooling access holes 55.

The tail lamp opening 42 is further defined by an upper rear corner member 60 and a lower rear corner member 62 of the first body side panel 22. The upper rear corner member 60 extends from a region of the rear panel portion adjacent to the rear rail edge 50 and the tail lamp opening 42. For example, the upper rear corner member 60 may curve transversely inboard to define a substantially vertical upper corner edge 66 adjacent to the tailgate 20 and a substantially horizontal upper corner edge 68. The upper rear corner member 60 also defines an upper rear corner tab 70 at the vertical upper corner edge 66 to provide an attachment surface. The upper rear corner member 60 and the rear rail edge 50 at least partially define an upper rear corner opening 76.

A closeout member 80 is at least partially disposed within the upper rear corner opening 76. For example, the closeout member 80 is secured to the rail member 46 at or adjacent to the rear rail edge 50. The closeout member 80 is also secured to the upper rear corner member 60. The closeout member 80 provides structural reinforcement to the D-pillar region 24d when secured to the rail member 46 and the upper rear corner member 60. The closeout member 80 may define an inboard edge 82 and an inboard tab 84 extending therefrom. The inboard tab 84 may be secured to the rail member 46. The closeout member 80 may define an accessory opening 86. The accessory opening 86 is sometimes referred to as a rear stake opening. The accessory opening 86 may provide an access region to assist in facilitating attachment of accessories to the vehicle 10. The closeout member 80 may also define an outboard tab 88. The outboard tab 88 may be secured to the first body side panel 22. For example, the outboard tab 88 may be secured to a portion of the upper rear corner member 60. The closeout member 80 may also define a forward tab 90 which may be secured to the rail member 46 adjacent to the rear rail edge 50. The closeout member 80 may further define other openings, such as a locating opening 92 which may assist in installing a component to the first body side panel 22 and may assist in installing the first body side panel 22 to the vehicle 10. The closeout member 80 may be made of five thousand series or six thousand series aluminum.

The lower rear corner member 62 extends in a substantially rearward and transverse direction from the rear panel portion of the first body side panel 22. For example, the lower rear corner member 62 may curve transversely inboard to define a substantially vertical lower rear corner tab 98 adjacent to the tailgate 20. The lower rear corner member 62 and the lower rear corner tab 98 may provide a surface for attachment thereto. For example, an extension member 100 may extend from the upper rear corner member 60 to the lower rear corner member 62. The extension member 100 may define an upper extension end adjacent to the closeout member 80 and a lower extension end adjacent to the lower rear corner member 62. The upper extension end of the extension member 100 may be secured to the closeout member 80 and/or to the upper rear corner member 60. The lower extension end of the extension member 100 may be secured to the lower rear corner member 62. As such, the extension member 100 may reinforce the first body side panel 22 at the D-pillar region 24d and also provide attachment points for other components in the D-pillar region 24d. The extension member 100 may also define a tailgate striker opening 104 to receive a striker of the tailgate 20.

Figure 8:
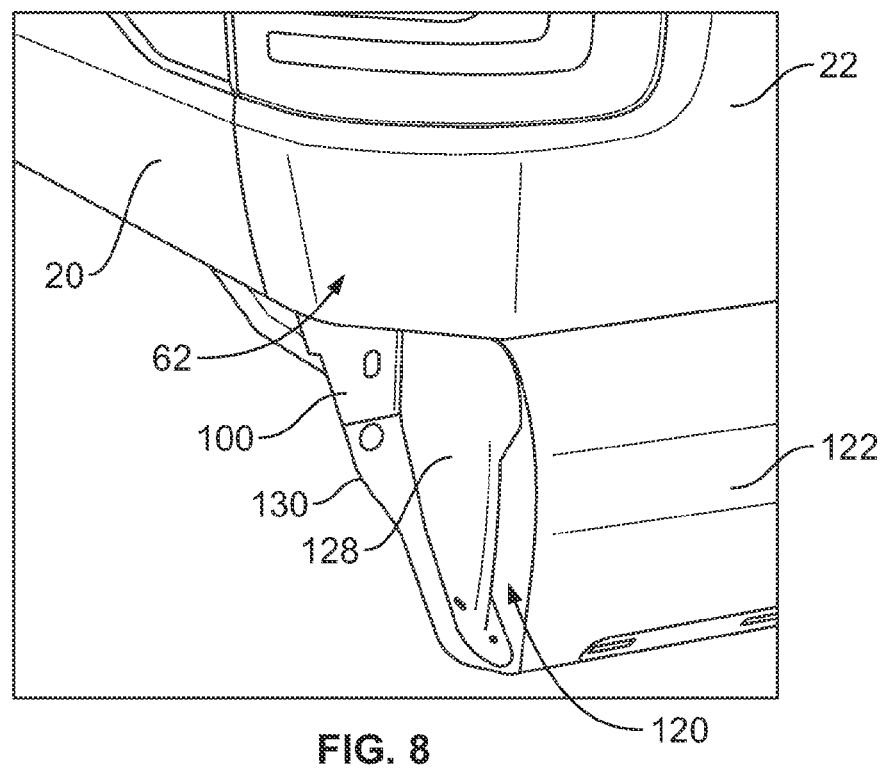
FIG. 8 is a fragmentary perspective view of the rear lower corner portion of the side panel from FIG. 7 shown with portions of a tailgate, a tail lamp, and a bumper pocket assembly.
Figure 9:
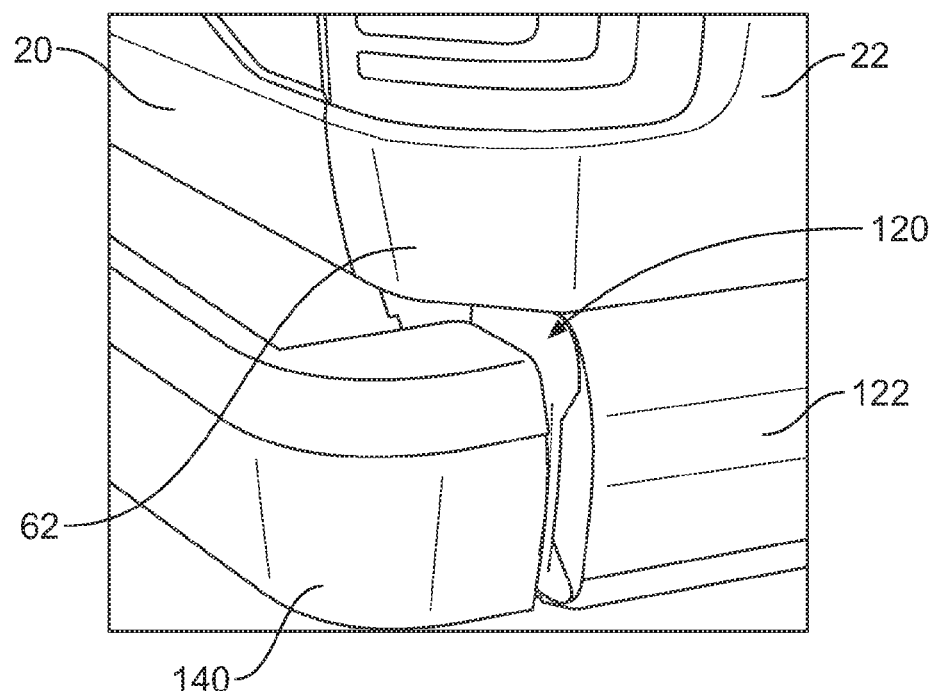
FIG. 9 is a fragmentary perspective view similar to FIG. 8 shown with an example of a bumper partially disposed within a bumper pocket.
Figure 12A:
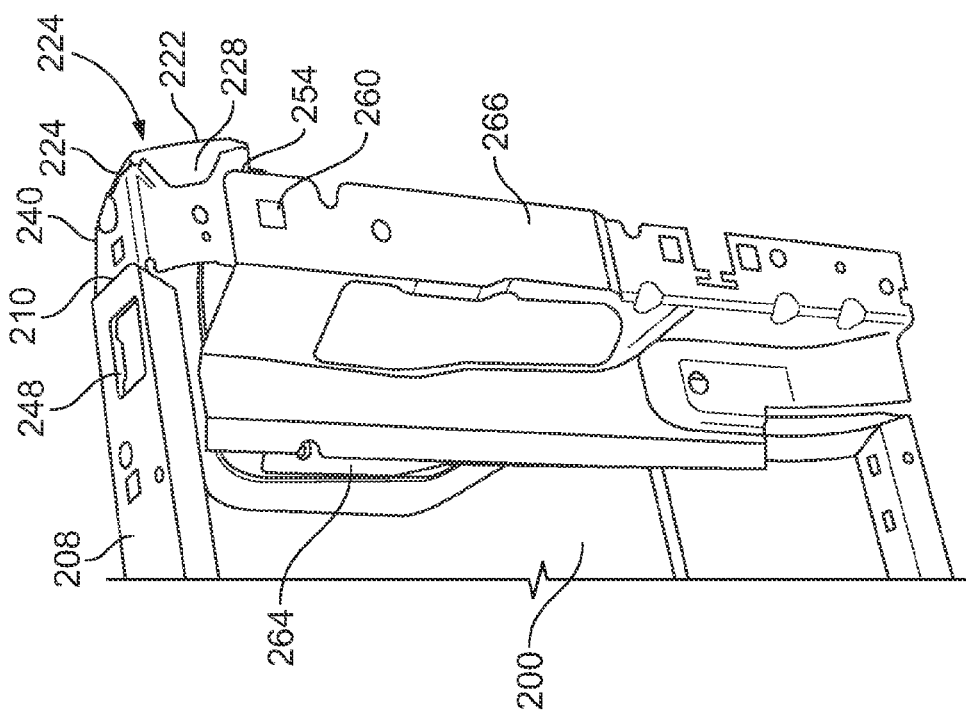
FIG. 12a is a fragmentary perspective view of an upper rear corner portion of the side panel of FIG. 10 shown with the closeout member from FIG. 11.
Figure 12B:
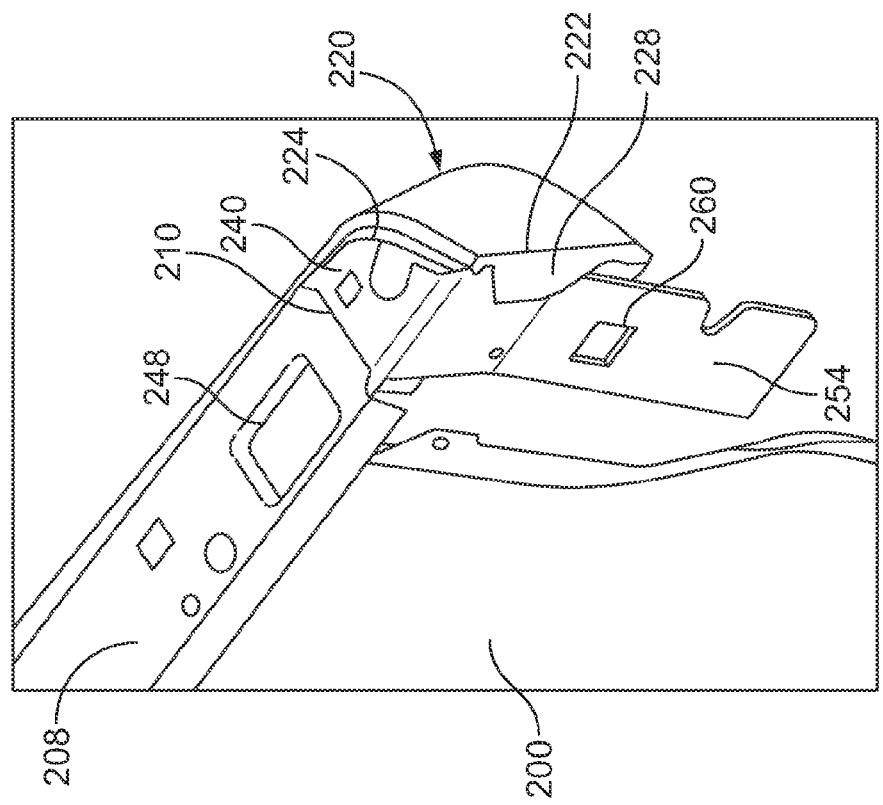
FIG. 12b is a fragmentary perspective view of the upper rear corner portion of the side panel of FIG. 10 shown with the closeout member from FIG. 11, an example of a rear box pillar inner support extension, and an example of a rear box pillar outer support extension.

FIGS. 7 through 9 show the lower rear corner member 62. The lower rear corner member 62 at least partially defines a bumper pocket opening 120 at or near the D-pillar region 24d. A base panel portion 122 may also partially define the bumper pocket opening 120. A bumper pocket tab 126 may extend from the base panel portion 122 to provide a surface for attaching vehicle components thereto. For example, a bumper pocket bracket 128 may be secured to the base panel portion 122 and include a flange 130. The bumper pocket bracket 128 may be secured to the bumper pocket tab 126 and the lower extension end of the extension member 100. The bumper pocket bracket 128 and the lower extension end of the extension member 100 may be sized such that a portion of a bumper 140 is at least partially disposed within the bumper pocket opening 120. The bumper pocket bracket 128 assists in reinforcing the D-pillar region 24d of the vehicle 10 at or proximate to the bumper pocket opening 120.

FIGS. 10 through 12b show another example of a body side panel for a truck box of a vehicle (not shown). In this example, a third body side panel 200 defines a wheel house opening 202 and a tail lamp opening 204. The third body side panel 200 may be made of five thousand series or six thousand series aluminum. A portion of the third body side panel 200 forward of the wheel house opening 202 is referred to as a front panel portion. A portion of the third body side panel 200 rearward of the wheel house opening 202 is referred to as a rear panel portion. An upper body side panel edge 206 is defined by the third body side panel 200 and extends from the front panel portion to at least the rear panel portion. A rail member 208 extends transversely inboard from the upper body side panel edge 206 and from the front panel portion to the rear panel portion. The rail member 208 also extends longitudinally along the upper body side panel edge 206 and defines a rear rail edge 210. The rail member 208 may also define one or more rail member openings 212 to provide access points for vehicle accessories and locating holes 213 to assist in installation of the third body side panel 200 to the vehicle.

The tail lamp opening 204 is further defined by an upper rear corner member 220 of the third body side panel 200. The upper rear corner member 220 may extend from a region of the rear panel portion adjacent to the rear rail edge 210 and the tail lamp opening 204. For example, the upper rear corner member 220 curves transversely inboard to define a substantially vertical upper corner edge 222 and a substantially horizontal upper corner edge 224. The upper rear corner member 220 may also define an upper rear corner tab 228 at the vertical upper corner edge 222 to provide an attachment surface. The upper rear corner member 220 and the rear rail edge 210 may at least partially define an upper rear corner opening 232.

Another example of a closeout member 240 may be at least partially disposed within the upper rear corner opening 232. For example, the closeout member 240 is secured to the rail member 208 at or adjacent to the rear rail edge 210. The closeout member 240 may also be secured to the upper rear corner member 220. The closeout member 240 provides structural reinforcement to the upper rear corner member 220 when secured to the rail member 208 and the upper rear corner member 220. The closeout member 240 defines an outboard edge 242 and an outboard tab 244 extending therefrom. The outboard tab 244 is secured to the rail member 208. The closeout member 240 defines a forward tab 245. The rail member 208 may define an accessory opening 248. The accessory opening 248 is sometimes referred to as a rear stake opening. The accessory opening 248 provides an access region to assist in facilitating attachment of accessories.

The closeout member 240 may also define an inboard edge 252 and an extension member 254 extending at a substantially ninety degree angle downwardly from the inboard edge 252. It is contemplated that the extension member 254 may extend at other appropriate angles. The extension member 254 is secured to the rail member 208 and the upper rear corner member 220. For example, the forward tab 245 may be secured to the rail member 208 at or near the rear rail edge 210. The extension member 254 may be secured to the upper rear corner tab 228. A D-pillar outer panel support extension 264 is secured to the third body side panel 200. A D-pillar inner panel support extension 266 is secured to the D-pillar outer panel support extension 264 and the third body side panel 200. The extension member 254 of the closeout member 240 is secured to the D-pillar inner panel support extension 266. The closeout member 240 reinforces the third body side panel 200 at the upper rear corner member 220 and also provides attachment points for other components. The extension member 254 may also define a tailgate striker opening 260 which aligns with a corresponding opening on the D-pillar inner panel support extension 266 to receive a striker of a tailgate (not shown). The closeout member 240 may be made of five thousand series or six thousand series aluminum.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A closeout member disposed within an opening partially defined by a corner member and a rail edge of a side panel adjacent to a tailgate and tail lamp of a pickup truck box, and comprising:
   an outboard side secured to the corner member and shaped to substantially match a curvature of the corner member; and
   a forward side secured at the rail edge, wherein the closeout member reinforces the curvature of the corner member.

2. The closeout member of claim 1, wherein the closeout member further comprises:
   an inboard edge; and
   an extension member extending at a substantially ninety degree angle downwardly from the inboard edge and is at least partially secured to the corner member.

3. The closeout member of claim 2, wherein the extension member defines a tailgate striker hole adjacent to the corner member.

4. The closeout member of claim 2, wherein the extension member extends from the corner member in a substantially rearward and transverse direction from a portion of the side panel adjacent to and below the tail lamp to a lower rear corner member.

5. The closeout member of claim 1, wherein the closeout member further defines an accessory hole adjacent to a rail member of the side panel that is configured to receive attachable accessories.

6. The closeout member of claim 1, wherein the side panel is five or six thousand series aluminum.

7. A pickup truck assembly comprising:
   a pickup truck bed having forward and rear ends;
   a header mounted to the truck bed at the forward end;
   a tailgate mounted for rotation to the bed at the rear end;
   one or more outer body side panels having forward box pillar and rear box pillar ends, mounted to the truck bed, secured to the header at the forward box pillar end, wherein the side panels define:
      an upper panel portion extending from the forward box pillar end to the rear box pillar end,
      a tail lamp opening at the rear box pillar end;
      a rail member transversely extending inboard from the upper panel portion and along a first longitudinal length from the forward box pillar end toward the rear box pillar end, and a rear rail edge adjacent to the tail lamp opening, and
      an upper rear corner member at the rear box pillar end extending from the upper panel portion adjacent to the rear rail edge and curving transversely inboard to define a substantially vertical corner edge adjacent to the tailgate and a substantially horizontal upper corner edge, wherein the rear rail edge and the upper corner edge at least partially define an upper rear corner opening; and
   a closeout member connected to the rail member and partially disposed within the upper rear corner opening to provide additional support to the upper rear corner member, wherein the closeout member is further connected for reinforcement to the upper rear corner member across the inboard transversely curved portion.

8. The assembly of claim 7, wherein a surface of the rail member defines a first plane, and wherein a surface of the closeout member defines a second plane substantially coplanar with the first plane.

9. The assembly of claim 7, further comprising a bumper pocket bracket, and wherein the side panel further comprises a lower rear corner member extending in a substantially rearward and transverse direction from a portion of the side panel to further define the tail lamp opening and a bumper pocket opening, and wherein the lower rear corner member defines a bumper pocket tab for securing the bumper pocket bracket, and wherein a portion of a bumper may be at least partially disposed within the bumper pocket opening.

10. The assembly of claim 9, further comprising an extension member having a rail extension portion secured to the upper rear corner member, and a vertical extension portion extending at a substantially ninety degree angle downwardly from the rail extension portion, and wherein the vertical extension portion is further secured to and reinforcing the upper rear corner member and the lower rear corner member.

11. The assembly of claim 10, wherein the extension member defines a tailgate striker hole adjacent to the lower rear corner member that is adapted to receive a striker of the tailgate.

12. The assembly of claim 7, wherein the closeout member defines an accessory hole rearward of the rear rail edge.

13. The assembly of claim 7, wherein the side panel is five or six thousand series aluminum.

14. A structural reinforcement assembly for an aluminum pickup truck box comprising:
   a truck bed having a rear end;
   a tailgate mounted for rotation to the bed at the rear end;
   a stamped outer body side panel secured to the truck bed and defining:
      a tail lamp opening,
      a wheel house opening,
      a front panel portion forward of the wheel house,
      a rear panel portion rearward of the wheel house;
      a rear upper corner member extending and curving from a region of the rear panel portion adjacent to the tail lamp opening to the tailgate,
      an upper edge extending from the front panel portion to the rear panel portion, and
      a rail member transversely extending inboard from substantially the upper edge along the front panel portion and rear panel portion and defining a transverse rear rail edge; and
   a closeout member sized for disposition within an upper rear opening defined by the rear upper corner member and the transverse rear rail edge, wherein the closeout member is secured to and reinforcing the upper rear corner member and the rail edge.

15. The assembly of claim 14, further comprising a bumper pocket bracket, and wherein the side panel further comprises a lower rear corner member extending in a substantially rearward and transverse direction from a portion of the side panel to further define the tail lamp opening and a bumper pocket opening, and wherein the lower rear corner member defines a bumper pocket tab for securing the bumper pocket bracket, and wherein a portion of a bumper is at least partially disposed within the bumper pocket opening.

16. The assembly of claim 15, further comprising an extension member having a rail extension portion secured to the upper rear corner member, and a vertical extension portion extending at a substantially ninety degree angle from the rail extension portion, and wherein the vertical extension portion is further secured to and reinforcing the lower rear corner member, the upper rear corner member, and the bumper pocket bracket.

17. The assembly of claim 14, wherein the closeout member defines an inboard edge and comprises an extension member extending at a substantially ninety degree angle downwardly from the inboard edge and is secured to the upper rear corner member.

18. The assembly of claim 17, wherein the closeout member further defines a tailgate striker opening adjacent to the upper rear corner member that is adapted to receive a striker of the tailgate.

19. The assembly of claim 14, wherein the closeout member defines an accessory hole for mounting accessories to the outer body side panel.

20. The assembly of claim 14, wherein the side panel is five or six thousand series aluminum.

\* \* \* \* \*